INVENTOR.
Richard E. Brown
Henry W. Matlock

United States Patent Office 2,785,806
Patented Mar. 19, 1957

2,785,806

OIL FILTER

Richard E. Brown, Chagrin Falls, and Henry W. Matlock, Garfield Heights, Ohio, assignors to Air Maze Corporation, Cleveland, Ohio, a corporation of Delaware Application April 27, 1953, Serial No. 351,314

10 Claims. (Cl. 210—184)

This invention relates to improvements in sealing means for filters and more particularly to a combined seal and support means used in liquid filters.

An object of this invention is to provide an improved seal which will maintain complete separation between clean liquid and dirty liquid chambers of a filter.

Another object is to provide improved sealing means between a removable filter element and a partition which separates the filter into two chambers.

A further object is to provide a tight seal in a liquid filter without requiring close tolerances during the manufacture and assembly.

Other objects and advantages of the present invention will be apparent from the accompanying drawings and description and the essential features thereof will be set forth in the appended claims.

In the drawings,

Fig. 1 is a top plan view of a liquid filter housing; while

Fig. 3 is a top plan view of one of the hollow filter leaves utilized in the present invention.

Fig. 4 is an enlarged transverse sectional view taken along the plane of line 4—4 of Fig. 3.

Figure 1:
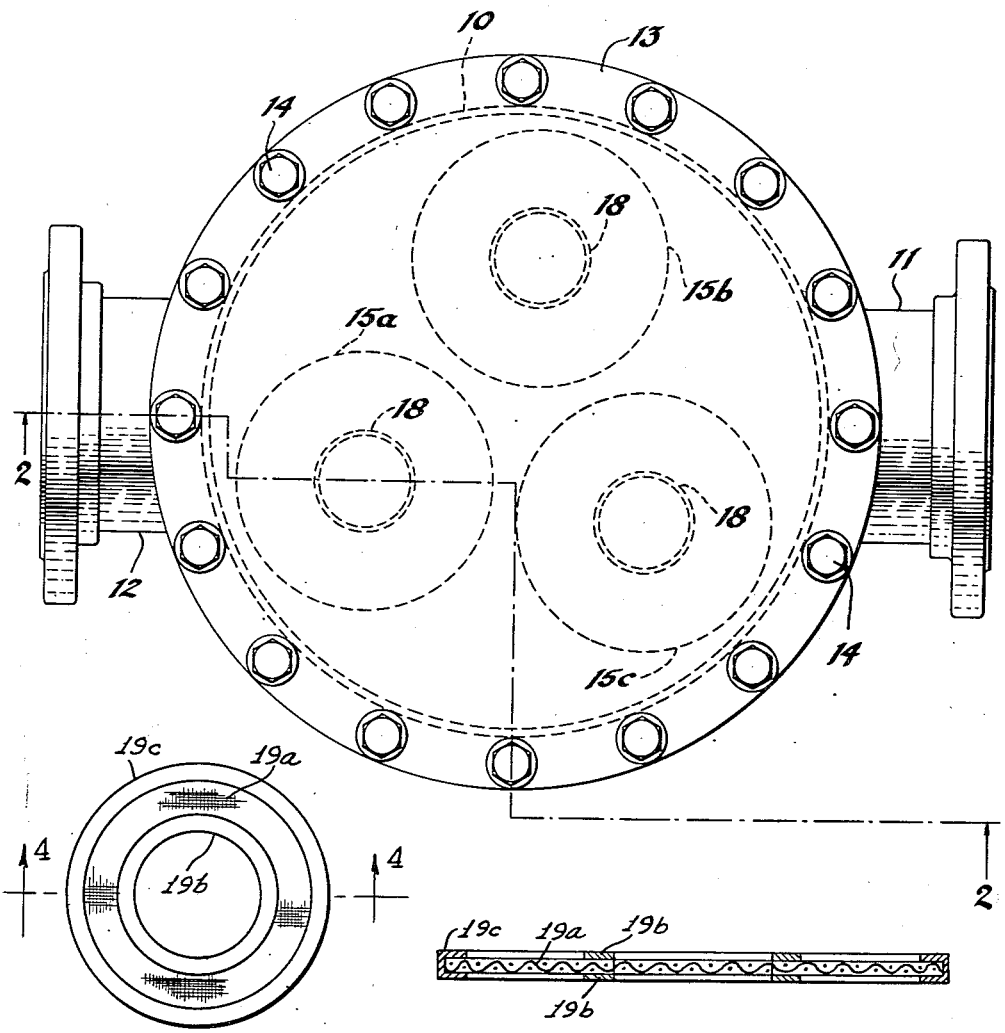
Figure 2:
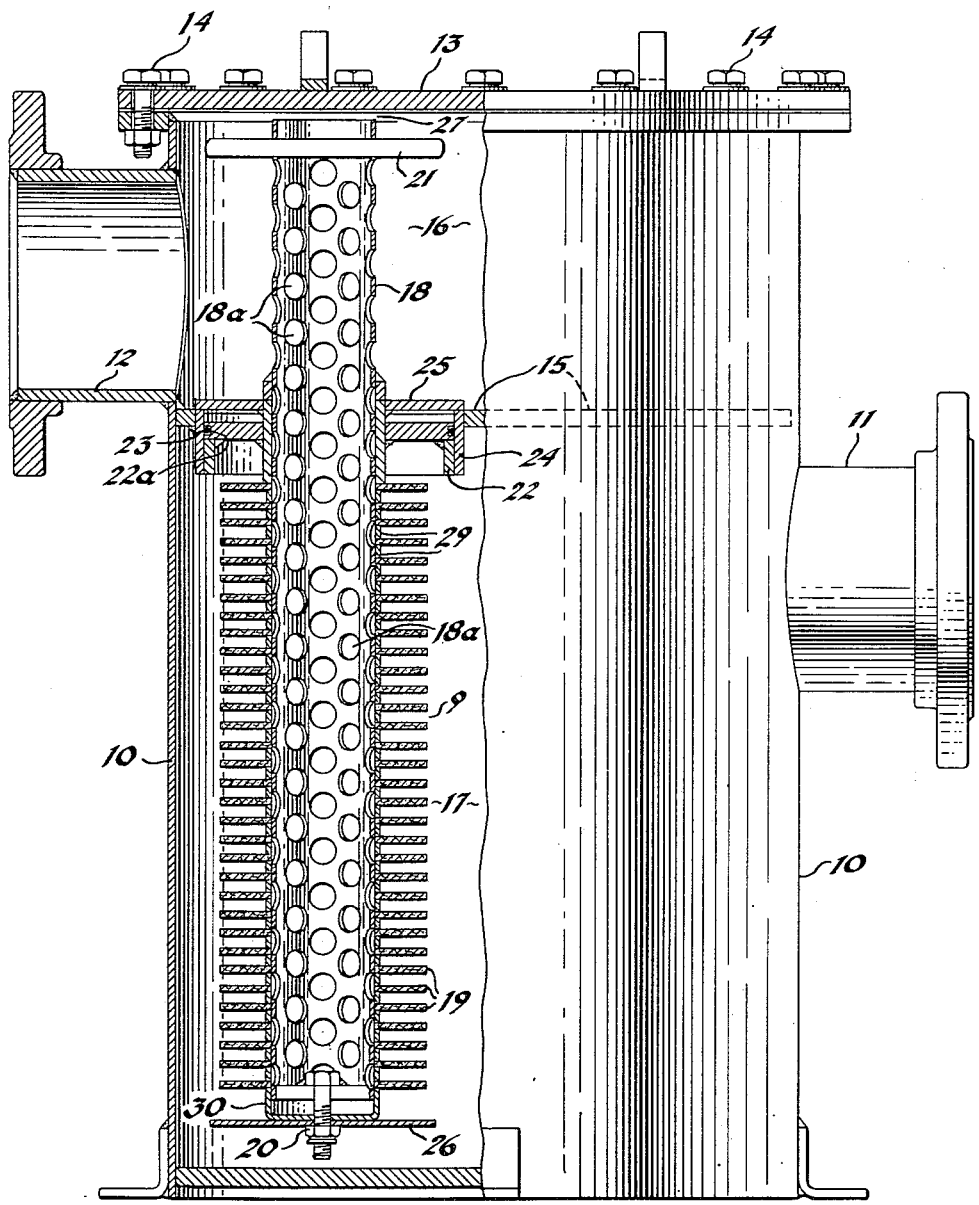
Fig. 2 is a side elevational view taken partly in section along the line 2—2 of Fig. 1.

While our invention is applicable to a housing containing a single filter element, we have shown three elements in a single housing adapted to filter a large volume of liquid through the three elements in parallel. Referring now to Fig. 1, I have shown a top plan view of a filter housing 10 having an inlet conduit 11 and an outlet conduit 12. The top of the filter housing is provided with a cover 13 which is fastened by means of bolts 14. The filter housing contains a partition 15 having three apertures 15a, 15b, and 15c for accommodating three filter cartridges or elements. In Fig. 2, the partition 15 is shown in position between the inlet conduit 11 and the outlet conduit 12, thus dividing the housing into two separate chambers 16 and 17. Passing through the partition apertures 15a, 15b and 15c and communicating between the two chambers 16 and 17 are three filter cartridges 9, one of which is shown in Fig. 2 composed of a central tube 18 having perforations 18a over substantially its entire area. A plurality of hollow filter leaves 19 are mounted on the perforated tube 18 and secured in place by means of a nut and bolt 20 on the bottom of the tube 18. The hollow leaves 19 may be constructed according to U. S. Patent No. 2,423,547 granted July 8, 1947, to Robert A. Behlen, or in any suitable manner. In Figs. 3 and 4 I have shown a hollow filter leaf of the type which may be utilized in the present invention. This comprises sheets 19a of flattened filter material such as wire screen or the like. This construction leaves the annular area of the sheets 19a open to dirty fluid to be filtered, which fluid flows inwardly along the filtering screen toward the center and then away through the hollow tube 18. At their inner diameter the sheets 19a are bound with annular ferrules 19b which are spaced apart and provided on both surfaces of the leaf. The space between the ferrules 19b provides means for the filter fluid to enter central tube 18. At its outer periphery the screen 19a is provided with a flat binding 19c in the form of a U-shape ferrule. The leaves extend in a series along the dot-dash lines of Fig. 2, with ring spacers 29 between adjacent leaves. Clamping cup 30 between nut 20 and the bottommost leaf 19 hold all spacers and leaves tightly clamped together. A handle 21 is located at the upper end of the tube 18 to facilitate removal and replacement of the filter cartridge. Removal of the filter cartridge 9 is required when it becomes clogged with dirt and no longer operates efficiently. At this time, it is necessary to remove the cartridge for cleaning, servicing and sometimes replacement. During removal of the filter cartridge, dirty or unfiltered liquids remain in the bottom chamber 17 of the filter housing 10.

A serious problem presents itself when a clean filter cartridge is put back in place again. The problem is to replace the cartridge quickly and easily and at the same time establish a good seal with the partition 15 so as to prevent the dirty unfiltered liquids in the bottom chamber 17 from entering the chamber 16 which contains the clean filtered liquid. In one form of our invention, the liquid is under a pressure of approximately forty-five pounds per square inch and unless a positive seal is provided between the partition 15 and the filter cartridge 9, the dirty liquid will be forced through such space without passing through the filter cartridge, thereby contaminating the entire system.

I have provided a novel and very inexpensive means for insuring a positive seal between the partition 15 and the filter cartridge 9. As shown in Fig. 2, a cylindrical member 22 is rigidly fixed to the tube 18. The member 22 has an annular groove 22a which carries an O-ring 23 made of rubber or other suitable material. The apertures 15a, 15b and 15c of partition 15 are provided about their edges with fixed cylindrical sleeves 24 which telescopically receive cylindrical sealing member 22 and the O-ring 23 as the filter cartridge is axially inserted through the end of the filter housing. With this construction, a leak-proof seal is formed between the filter cartridge 9 and the cylindrical sleeve 24 of the partition 15.

A plate or flange 25 is fastened to the tube 18 slightly above the cylindrical member 22, and functions as a stop member. Flange member 25 is of greater diameter than the apertures 15a, 15b or 15c of the partition 15 and as a result, engages the upper surface of said partition which prevents pushing the cartridge too far down when it is being inserted into the filter housing.

Another plate or flange 26, similar to plate 25, however, of a diameter slightly less than that of the aperture in the partition and slightly greater than that of the hollow filter leaves 19, is fastened to the bottom of the tube 18 by nut and bolt 20. The plate 26 prevents damage to the bottom filter leaf affixed to tube 18, when the filter cartridge 9 is being inserted into the housing. Plate 26 has the additional value of cooperating with the plate 25 to protect filter leaves 19 from damage when the cartridge is removed from its housing and laid on its side during the cleaning and servicing process. The plates 25 and 26 will engage the supporting surface so as to hold the leaves 19 clear of such surfaces. In addition, it will also hold the cylindrical member 22 away from any surface so as to prevent damage of any of these parts.

A gap 27 is provided between the top of the tube 18 and the filter cover 13. I have found that this gap should be held to approximately ⅛ of an inch. This allows considerable tolerance in the manufacture of the tube 18, cylindrical member 22 and the cylindrical sleeve 24 of partition 15. It further insures that the cover 13 of the filter housing 10 will always go on when the filter cartridge is inserted in the housing. As the filter cartridge becomes dirty, the differential in pressure between the lower chamber 17 and the upper chamber 16 increases and will cause the filter cartridge 9 to be moved upwardly due to the pressure on the lower base of the cylindrical member 22; however, such movement is limited when the tube 18 hits the top cover 13 of the filter housing 10. The seal between the telescopically engaged members 22 and 24 is of such extent as to remain effective during this limited movement. The O-ring 23 remains in sealing engagement with the cylindrical sleeve 24 throughout such movement and insures a good seal between the clean chamber 16 and the dirty chamber 17. The extent of gap 27 is controlled by the positioning of the stop flange 25 on the tube 18, since this member 25 determines how much of the tube 18 will extend above and below the partition 15.

The operation of our improved device is as follows: Liquid under pressure enters the lower chamber 17 of the filter housing 10 through the inlet conduit 11. It then passes through the hollow filter leaves 19 and enters the perforated tube 18 through apertures communicating with the respective interiors of the filter leaves. The filter leaves 19 contain filtering material through which the liquid must pass before entering the tube 18. The liquid passes through the tube 18 which communicates with the upper chamber 16 through the partition 15. The filtered liquid egresses from the chamber 16 by means of outlet conduit 12.

It is of vital importance that the seal between the partition 15 and the filter cartridge 9 remain tight even though pressures in the lower chamber 17 increase substantially due to the filter means becoming dirty. By providing telescoping engagement between the cylindrical sleeve 24 and cylindrical member 22 in cooperation with gap 27, we find that an extremely effective seal can be secured.

What we claim is:

1. In a filter housing having inlet and outlet conduits communicating with said housing and a partition having an aperture, said partition located between said inlet and outlet conduit; the combination therewith of a perforated tube having hollow filter leaves mounted on said tube, the hollows of said leaves communicating with said tube through said perforations, said tube extending through the partition and being axially removable through an end of the housing, a cylindrical member fixed to said tube, a cylindrical sleeve member connected to said partition about said aperture, said cylindrical member telescopically engaging said cylindrical sleeve member, one of said members having an annular groove, an O-ring carried by said groove forming a seal between said members and dividing the filter housing into two separate chambers, one containing dirty unfiltered liquids the other containing clean filtered liquids, a first flange member of greater width than the sleeved aperture in the partition and connected to the portion of the perforated filter tube which extends into the clean liquid chamber of the filter housing and engaging the surface of the partition to limit the amount the filter tube may be inserted into the dirty liquid chamber of said filter housing, a second flange member of greater diameter than said filter leaves and capable of being inserted through the sleeved aperture in the partition is fixed to the end of the perforated filter tube which extends into the dirty fluid chamber, thus protecting the filter leaves during insertion and cooperating with said first flange member to support said filter tube and filter leaves when the filter element is removed from said housing and placed on its side.

2. In a filter housing having inlet and outlet conduits communicating with said housing and a partition having an aperture, said partition located between said inlet and outlet conduit; the combination therewith of a perforated tube having hollow filter leaves mounted on said tube, said hollow filter leaves communicating with said tube through said perforations, said tube extending through the partition and being axially removable through an end of the housing, a cylindrical member fixed to said tube, a cylindrical sleeve member connected to said partition about said aperture, said cylindrical member telescopically engaging said cylindrical sleeve member, one of said members having an annular groove, an O-ring carried by said groove forming a seal between said members and dividing the filter housing into two separate chambers, one containing dirty unfiltered liquids, the other containing clean filtered liquids, a first flange member of greater width than the sleeved aperture in the partition and connected to the portion of the perforated filter tube which extends into the clean liquid chamber of the filter housing and engaging the surface of the partition to limit the amount the filter tube may be inserted into the dirty liquid chamber of said filter housing, that portion of the filter tube extending into said clean liquid chamber being separated from the adjacent end of the filter housing by a small gap, said seal being of an extent to remain effective even though said gap be closed by pressures in the dirty liquid chamber forcing said tube toward said adjacent end of the filter housing.

3. In a filter housing having inlet and outlet conduits communicating with said housing and a partition having an aperture, said partition located between said inlet and outlet conduit; the combination therewith of a perforated tube having hollow filter leaves mounted on said tube, said hollow filter leaves communicating with said tube through said perforations, said tube extending through the partition and being axially removable through an end of the housing, a cylindrical member fixed to said tube, a cylindrical sleeve member connected to said partition about said aperture, said annular cylindrical member telescopically engaging said cylindrical sleeve member, one of said members having an annular groove, an O-ring carried by said groove forming a seal between said members and dividing the filter housing into two separate chambers, one containing dirty unfiltered liquids, the other containing clean filtered liquids, a first flange member of greater width than the sleeved aperture in the partition and connected to the portion of the perforated filter tube which extends into the clean liquid chamber of the filter housing and engaging the surface of the partition to limit the amount the filter tube may be inserted into the dirty liquid chamber of said filter housing.

4. In a filter housing having inlet and outlet conduits communicating with said housing and a partition having an aperture, said partition located between said inlet and outlet conduit; the combination therewith of a perforated tube having hollow filter leaves mounted on said tube, said hollow filter leaves communicating with said tube through said perforations, said tube extending through the partition and being axially removable through an end of the housing, a cylindrical member fixed to said tube, a cylindrical sleeve member connected to said partition about said aperture, said annular cylindrical member telescopically engaging said cylindrical sleeve member, one of said members having an annular groove, an O-ring carried by said groove forming a seal between said members and dividing the filter housing into two separate chambers, one containing dirty unfiltered liquids, the other containing clean filtered liquids.

5. In a filter housing having inlet and outlet conduits communicating with said housing and a partition having an aperture, said partition located between said inlet and outlet conduit; the combination therewith of a perforated tube having hollow filter leaves mounted on said tube, the hollows of said leaves communicating with said tube through said perforations, said tube extending through the partition and being axially removable through an end of the housing, a cylindrical member fixed to said tube, a cylindrical sleeve member connected to said partition about said aperture, said cylindrical member telescopically engaging said cylindrical sleeve member, one of said members having an annular groove, an O-ring carried by said groove forming a seal between said members and dividing the filter housing into two separate chambers, one containing dirty unfiltered liquids, the other containing clean filtered liquids, a first flange member of greater width than the sleeved aperture in the partition and connected to the portion of the perforated filter tube which extends into the clean liquid chamber of the filter housing and engaging the surface of the partition to limit the amount the filter tube may be inserted into the dirty liquid chamber of said filter housing, that portion of the filter tube extending into said clean liquid chamber being separated from the adjacent end of the filter housing by a small gap, said seal being of an extent to remain effective even though said gap be closed by pressures in the dirty liquid chamber forcing said tube toward said adjacent end of the filter housing, a second flange member of greater diameter than said filter leaves and capable of being inserted through the sleeved aperture in the partition and fixed to that end of the perforated filter tube which extends into the dirty liquid chamber, thus protecting the filter leaves during insertion and cooperating with said first flange member to support said filter tube and filter leaves when the filter element is removed from said housing and placed on its side.

6. A filter housing having liquid filter means therein, inlet and outlet conduits communicating with said housing, a cover closing the top of said housing, generally horizontally extending partition means between said inlet and outlet, said filter means comprising a perforated tube having hollow filter leaves mounted on said tube, said tube extending generally vertically in said housing, said hollow filter leaves communicating with said tube through said perforations, said perforated tube extending through the partition means and being removable axially from said housing, an annular cylindrical member rigidly fixed to said tube, an annular cylindrical sleeve member connected to said partition, said annular cylindrical member telescopically engaging said cylindrical sleeve member, one of said members containing a groove having an annular O-ring carried therein, sealingly engaged between said members, an upper flange member of greater width than the sleeved opening in the partition attached to the perforated tube above said cylindrical member and engaging the upper surface of the partition to limit the amount the filter tube may be inserted into said filter housing, there being a small gap between the upper end of said tube and said cover, the seal being of such vertical extent as to remain effective even though said gap be closed due to pressures forcing said filter tube upwardly.

7. A filter housing having liquid filter means therein, inlet and outlet conduits communicating with said housing, generally horizontally extending partition means between said inlet and outlet, said filter means comprising a perforated tube having hollow filter leaves mounted on said tube, said tube extending generally vertically in said housing, the hollows of said leaves communicating with said tube through said perforations, said perforated tube extending through the partition means and being removable axially from said housing, an annular cylindrical member rigidly fixed to said tube, an annular cylindrical sleeve member connected to said partition, said annular cylindrical member telescopically engaging said cylindrical sleeve member, and one of said members containing an annular groove having an annular O-ring carried therein, forming a tight seal between said members.

8. A filter housing having liquid filter means therein, inlet and outlet conduits communicating with said housing, a cover closing the top of said housing, generally horizontally extending partition means between said inlet and outlet, said filter means comprising a perforated tube having hollow filter leaves mounted on said tube, said tube extending generally vertically in said housing, said hollow filter leaves communicating with said tube through said perforations, said perforated tube extending through the partition means and being removable axially from said housing, an annular cylindrical member rigidly fixed to said tube, an annular cylindrical sleeve member connected to said partition, said annular cylindrical member telescopically engaging said cylindrical sleeve member, one of said members containing an annular groove having an annular O-ring carried therein sealingly engaged between said members, an upper flange member of greater width than the sleeved opening in the partition attached to the perforated tube above said cylindrical member and engaging the upper surface of the partition to limit the amount the filter tube may be inserted into said filter housing, there being a small gap between the upper end of said tube and said cover, the seal being of such vertical extent as to remain effective even though said gap be closed due to pressures forcing said filter tube upwardly, a lower flange member of a greater diameter than said filter leaves, and capable of being inserted through the sleeved opening in the partion and fixed to the bottom of said perforated tube for protecting the filter leaves during insertion into said housing and cooperating with the upper flange member to protect said filter leaves from damage when the filter means is removed from said housing and placed on its side.

9. A filter housing having liquid filter means therein, inlet and outlet conduits communicating with said housing, partition means in said housing between said inlet and outlet conduits, said partition means having an opening, a filter element in said housing extending through said partition, an axially extending sealing member fixed to said filter element, said axially extending sealing member telescopingly engaging the edge of the opening in said partition, said axially extending sealing member forming a seal with said partition of such extent as to remain effective even though said filter element be subject to axial movement.

10. In a filter housing having liquid filter means therein, inlet and outlet conduits communicating with said housing, partition means in said housing between said inlet and outlet conduits, said partition means having a through opening, a filter element in said housing extending through said partition, a cylindrical sealing member fixed to said filter element so as to telescopically engage the edge of the opening in said partition, an O-ring sealing member forming a seal between the cylindrical member and the edges of said partition opening, said seal remaining effective even though said filter element be subject to axial movement.

References Cited in the file of this patent

UNITED STATES PATENTS

| | | |
|---|---|---|
| 1,503,421 | Innes | July 29, 1924 |
| 1,619,118 | Guy et al. | Mar. 1, 1927 |
| 2,320,725 | Hautzenroeder | June 1, 1943 |
| 2,423,547 | Behlen | July 8, 1947 |
| 2,533,192 | Kennedy | Dec. 5, 1950 |
| 2,538,575 | Kracklauer | Jan. 16, 1951 |

FOREIGN PATENTS

| | | |
|---|---|---|
| 227,550 | Great Britain | Jan. 22, 1925 |